United States Patent [19]
Pan et al.

[11] Patent Number: 5,982,961
[45] Date of Patent: Nov. 9, 1999

[54] ORGANIC CRYSTAL COMPOUND OPTICAL WAVEGUIDE AND METHODS FOR ITS FABRICATION

[75] Inventors: Feng Pan, Clifton Park; Kevin J. McCallion, Albany, both of N.Y.

[73] Assignee: Molecular OptoElectronics Corporation, Watervliet, N.Y.

[21] Appl. No.: 08/931,122

[22] Filed: Sep. 16, 1997

Related U.S. Application Data

[63] Continuation-in-part of application No. 08/786,033, Jan. 21, 1997, Pat. No. 5,892,857, and application No. 08/785,871, Jan. 21, 1997.

[51] Int. Cl.$^6$ .................................................... G02B 6/26
[52] U.S. Cl. .................................. 385/30; 385/27; 385/28
[58] Field of Search .................................. 385/15, 27, 28, 385/30, 39, 50

[56] References Cited

U.S. PATENT DOCUMENTS

| | | | |
|---|---|---|---|
| 4,603,940 | 8/1986 | Shaw et al. | 350/96.15 |
| 4,867,518 | 9/1989 | Stamnitz et al. | 350/95.15 |
| 4,895,422 | 1/1990 | Rand et al. | 350/96.15 |
| 5,005,175 | 4/1991 | Desurvire et al. | 372/6 |
| 5,007,694 | 4/1991 | Chang | 350/96.14 |
| 5,007,695 | 4/1991 | Chang | 350/96.14 |
| 5,064,265 | 11/1991 | Khanarian et al. | 385/130 |
| 5,067,788 | 11/1991 | Jannson et al. | 385/2 |
| 5,094,553 | 3/1992 | Yakymyshyn et al. | 385/122 |
| 5,194,984 | 3/1993 | Boden et al. | 359/321 |
| 5,274,495 | 12/1993 | Shirasaki | 359/330 |
| 5,292,888 | 3/1994 | Stewart | 546/347 |
| 5,323,482 | 6/1994 | Stewart et al. | 385/141 |
| 5,332,827 | 7/1994 | Stewart et al. | 546/347 |
| 5,360,911 | 11/1994 | Boden et al. | 546/347 |
| 5,396,362 | 3/1995 | Yakymyshyn et al. | 359/245 |
| 5,448,665 | 9/1995 | Kershaw et al. | 385/30 |

OTHER PUBLICATIONS

"In–Line Fibre–Optic Intensity Modulator Using Electro–Optic Polymer" Electronic Letters, vol. 28, No. 11, pp. 985–986, May 21, 1992.

K. McCallion, W. Johnstone, and G. Fawcett, "Tunable in–line fiber–optic bandpass filter", Optics Letters, vol. 19, No. 8, pp. 542–544, Apr. 15, 1994.

W. Johnstone, G. Thursby, D. Moodie, R. Varshney, and B. Culshaw, "Fibre Optic Wavelength Channel Selector With High Resolution", Electronics Letters, vol. 28, No. 14, pp. 1364–1365, Jul. 2, 1992.

W. Johnstone, G. Thursby, R. Varshney, D. Moodie, K. McCallion, and B. Culshaw, "Wavelength Selective Optical Fibre Components Using Solid State Waveguide Overlays", Fibre Optic Components And Reliability, SPIE vol. 1580, pp. 224–229, Sep. 1991.

W. Johnstone, S. Murray, G. Thursby, M. Gill, A. McDonach, D. Moodie, and and B. Culshaw, "Fibre Optic Modulators Using Active Multimode Waveguide Overlays", Electronics Letters, vol. 27, No. 11, pp. 894–896, May 23,1991.

K. McCallion, W. Johnstone and G. Thursby, "Investigation of Optical Fibre Switch Using Electro–Optic Interlays", Electronics Letters, vol. 28, No. 4, pp. 410–411, Feb. 13, 1992.

(List continued on next page.)

*Primary Examiner*—John D. Lee
*Assistant Examiner*—Victoria D. Hao
*Attorney, Agent, or Firm*—Heslin & Rothenberg. P.C.

[57] ABSTRACT

An optical coupling device, or a compound waveguide, in which optical energy is coupled to or from an optical signal propagating along a transmitting waveguide is disclosed. The optical coupling device includes a thin film organic crystal waveguide positioned in optical proximity to a portion of the transmitting waveguide. The organic crystal waveguide has a first, coupling surface facing the transmitting waveguide through which the optical energy is coupled. The transmitting waveguide may be a fiber optic having at least some material removed along a side thereof to facilitate the coupling of optical energy between the fiber optic and the organic crystal waveguide. Polishing and lapping methods for producing the thin film organic crystal waveguide, with optically smooth surfaces, are also disclosed, as are organic salt implementations of the organic crystal.

51 Claims, 4 Drawing Sheets

OTHER PUBLICATIONS

C.A. Miller, M.C. Brierley, and S.R. Mallinson, "Exposed–core single–mode–fiber channel–dropping filter using a high–index overlay waveguide", Optics Letters, vol. 12, No. 4, pp. 284–285, Apr. 1987.

G. Fawcett, W. Johnstone, I. Andonovic, D.J. Bone, T.G. Harvey, N. Carter and T.G. Ryan, "In–Line Fibre–Optic Intensity Modulator Using Electro–Optic Polymer", Electronics Letters, vol. 28, No. 11, pp. 985–986, May 21, 1992.

S. Creaney, W. Johnstone, and K. McCallion, "Continuous–Fiber Modulator with High–Bandwidth Coplanar Strip Electrodes", IEEE Photonics Technology Letters, vol. 8, No. 3, pp. 355–357, Mar. 1996.

Krassimir P. Panajotov, "Evanescent filed coupling between a single–mode fiber and a planar waveguide with absorption or gain", J. Opt. Soc. Am. B, vol. 13, No. 11, pp. 2468–2476, Nov. 1996.

Stewart, Kevin R., "Organic Crystals Give Optoelectronics a Boost", Phototonics Spectra, pp. 104–108, Jul. 1994.

Bradley, D., "Plastics That Play on Lights", Science, vol. 261, pp. 1272–1273, Sep. 3, 1993.

S.R. Marder and J.W. Perry, "Nonlinear Optical Polymers: Discovers to Market in 10 Years?", Science, vol. 263, pp. 1706–1707, Mar. 1994.

McCallion, W. Johnstone and G. Thursby, "Investigation of Optical Fiber Switch Using Electro–Optic Interlays", Electronic Letters, Dec. 4, 1991, (2 pgs.).

K. Thyagarajan, C.W. Chien, R.V. Ramaswamy, H.S. Kim and H.C. Cheng, "Proton–exchanged periodically segmented waveguides in $LiNbO_3$", Optics Letters, vol. 19, No. 12, Jun. 1994.

M.L. Bortz, M. Fujimura and M.M. Fejer, "Increased acceptance bandwidth for quasi–phasematched second harmonic generation in $LiNbO_3$ waveguides", IEEE, Oct. 1993, (2 pgs.).

S. Helmfrid, R. Laurell and G. Arvidsson, "Optical Parametric Amplification of a 1.54 $\mu$m Single–Mode DFB Laser in Ti: $LiNbO_3$ Waveguide", Journal of Lightwave Technology, vol. II, No. 9, pp. 1459–1469, Sep. 1993.

R.A. Baumgarter and R.L. Byer, "Optical Parametric Amplification", IEEE Journal of Quantum Electronics, vol. QE–15, No. 6, pp. 432–444, Jun. 1979.

F. Pan, G. Knöpfle, C. Bosshard, S. Follonier, R. Spreiter, M.S. Wong and P. Günter, "Electro–Optic Properties of the Organic Salt 4–N, N–dimethlamino–4'–N'–methyl–stilbazolium tosylate", Applied Phys. Letters, vol. 69, No. 1, pp. 13–15, Jul. 1, 1996.

C. Bosshard, M.S. Wong, R. Speriter, S. Follonier, U. Meier and P. Günter, "Novel Organic Crystals for Nonlinear and Elector–Optics", R.W. Munn et al., (Eds.) in Electrical and Related Properties of Organic Solids, pp. 279–296, Jul. 1, 1997.

T. Kondo & R. Ito, "Quadratic Nonlinear Optic Effects in Crystalling Waveguiding Strucutures" in "Molecular Nonlinear Optics" by J. Zyrs, Academic Press, Boston, pp. 201–243, (1994).

fig. 1a fig. 1b fig. 2 fig. 5 fig. 3 fig. 4a fig. 4b

ORGANIC CRYSTAL COMPOUND OPTICAL WAVEGUIDE AND METHODS FOR ITS FABRICATION

RELATED APPLICATION INFORMATION

This Application is a Continuation-in-Part of the following commonly assigned, previously filed U.S. Patent Applications:

U.S. patent application Ser. No. 08/786,033, Attorney Docket No. 0953.021, filed Jan. 21, 1997 and entitled "Electro-Optic Compound Waveguide Modulator (now U.S. Pat. No. 5,892,857);"

U.S. patent application Ser. No. 08/785,871, Attorney Docket No. 0953.022, filed Jan. 21, 1997 and entitled "Compound Optical Waveguide And Filter Applications Thereof."

This Application is related to the following commonly assigned, previously filed U.S. Patent Application:

U.S. patent application Ser. No. 08/786,047, Attorney Docket No. 0953.023, filed Jan. 21, 1997 and entitled "Optical Amplifier and Process for Amplifying an Optical Signal Propagating in a Fiber Optic (now U.S. Pat. No. 5,815,309)."

Each of these three (3) U.S. Patent Applications is hereby incorporated by reference herein in its entirety.

TECHNICAL FIELD

This invention relates to optical signal transmission, and in particular to a compound waveguide within which optical energy is coupled to or from a transmitting waveguide using another, thin film organic crystal waveguide placed in proximity thereto. This invention also relates to methods of fabricating the compound waveguide.

BACKGROUND OF THE INVENTION

A compound waveguide contains a first, optical signal transmitting waveguide, and a second optical waveguide placed in optical proximity to at least a portion of the first waveguide. The second waveguide (possibly electro-optically tunable) can be used for the coupling of optical energy, within a selectable spectral band, to or from the first waveguide. The coupling effect between the first and second waveguides can be utilized in a variety of optical signal processing applications.

For example, in some filtering applications, efficient recollection of the coupled optical energy for further use (e.g., in signal detection or demodulation, source stabilization feedback) is required. Multiple wavelength bands may be transmitted through the first waveguide, in a wavelength division multiplexing (WDM) system, in which case the second waveguide can be used as a filter to extract information carried in one of the bands. If an electro-optic material is used to form the second waveguide, the device can be configured as an active, electro-optically tunable filter. In another embodiment, the geometric and physical properties of the second waveguide itself may result in a useful passive filter inherently tuned to a particular wavelength of interest.

As another example, if an electro-optic material is used to form the second waveguide, the device can be configured as an intensity modulator for a fixed wavelength signal transmitted through the first waveguide. By applying an electric field to the second waveguide using, for example, a suitable high-speed electrode pattern, a refractive index change can be induced in the second waveguide and a corresponding change in the spectral response results. The transmitted intensity of the signal in the first waveguide can therefore be modulated by the changing spectral response, resulting in a modulator which can operate at up to microwave frequencies.

The first, transmitting waveguide may be implemented as a fiber optic. There are at least two types of possible architectures for such fiber optic compound waveguides: one architecture in which the fiber is physically broken to accommodate the insertion of the second, coupling waveguide; and another architecture in which no fiber discontinuity is required. This second architecture (more fully discussed below) involves the removal of a portion of the cladding of the fiber optic and "overlaying" the second waveguide in optical proximity to this altered area of the fiber. Evanescent mode coupling therefore occurs between the fiber and the second, "overlay" waveguide as a function of the size, shape, and refractive index of the overlay waveguide.

This overlay waveguide architecture substantially confines the transmitted optical signal to the fiber core without significant core interruption, thereby providing low loss and high mechanical and thermal stability. When an electro-optic material is used as the overlay waveguide, the device can be used for electro-optic bandpass filtering or electro-optic amplitude modulation. (See, e.g., W. Jonstone, S. Murray, M. Gill, A. McDonach, G. Thursby, D. Moodie and B. Culshaw, "Fiber Optic Modulators Using Active Multimode Waveguide Overlays," Electron. Lett., 27 894 (1991), hereby incorporated by reference herein in its entirety.)

The criteria for high-performance electro-optic modulators are large electro-optic modulation bandwidth and low drive power. These criteria are dominated by the properties of the electro-optic materials employed, such as the electro-optic coefficient, dielectric constant, transparency, and linear refractive index. Inorganic ionic electro-optic crystals, such as $LiNbO_3$ and $KNbO_3$, have been well investigated and developed for such applications. In inorganic ionic crystals, lattice vibrations contribute significantly to the electro-optic coefficients and the dielectric constant leading to a strong frequency dependence of both properties. These ionic contributions increase electro-optic effects considerably but also increase the dielectric constants, thus limiting bandwidth. At high frequencies, the wavelength of the modulating electric field becomes shorter than the modulator length. In this case, modulation of the optical signal is achieved with traveling microwaves. There are limits to the modulation bandwidth due to a refractive index mismatch between the microwaves and optical waves. The 3 dB bandwidth of the modulator (frequency at which the power in the optical sidebands is reduced by one-half) is given by:

$$\Delta f_{3dB} = \frac{1.4c}{\pi |n_o - n_m| L}$$

where $n_o$ and $n_m (=\sqrt{\in_m})$ are the refractive indices at optical and microwave frequencies, respectively, c is the speed of light, and L is the waveguide length. For example, for an $LiNbO_3$ crystal, $n_o=2.2$ (@632.8 nm), $n_m=4.2$, the bandwidth $\Delta f_{3\ dB}$ [GHz]=6.7 for L=1 cm; and for a $Knbo_3$ crystal, $n_o=2.169$(@632.8 nm), $n_m=4.9$, the bandwidth $\Delta f_{3\ dB}$ [Ghz]=4.9 for L=1 cm. Nevertheless, inorganic materials can be used for fast electro-optic modulators. By using special electrode/waveguide geometries, the microwave speed can be increased. For example, a 40 Ghz bandwidth Ti:$LiNbO_3$ modulator has been demonstrated.

There are other limitations imposed on wide-band optical modulators for communication purposes based on fundamental physics. One of them is the power requirement in electro-optic amplitude modulators. The value $n^7r^2_{eff}/\in$ can be regarded as a figure of merit for this configuration if a minimum drive power is required. For example, for $LiNbO_3$ crystal, n=2.134 (@1300 nm), $r_{33}$=28 pm/V, $\in^s$=28, the figure of merit $n^7r^2_{eff}/\in$ is 6.0[×10$^3$(pm/V)$^2$]; and for $Knbo_3$ crystal, n=2.109 (@1300 nm), $r_{33}$=34 pm/V, $\in^s$=24, the figure of merit $n^7r^2_{eff}/\in$ is 8.9 [×10$^3$(pm/V)$^2$].

The use of organic crystals has recently been proposed for optical coupling applications. (The term "organic crystal" as used herein is not meant to include any polymers that may have a crystalline structure.) Unlike the inorganic, ionic materials discussed above, the origin of the electro-optic effect in organic substances is mainly electronic, and therefore a smaller dependence on the frequency of the applied field is experienced. In addition, large electro-optic coefficients, high modulation bandwidths, and low drive powers are advantages of molecular crystals. 4-N,N-dimethylamino-4'-N'-methyl-stilbazolium tosylate (hereinafter "DAST") is an organic salt crystal in which the stilbazolium, a very efficient organic chromophore, is used as the optically nonlinear part. A crystal structure analysis shows that the angular deviation of the charge-transfer axes of the stilbazolium chromophores is about 20° from a complete alignment. Therefore, the exceptionally large non-linear optical susceptibilities and the good alignment of the chromophores in the crystal indicate that DAST is a useful electro-optic material. As expected from the molecular arrangement, the electro-optic coefficients, $r_{11}$, have been found to be quite large with values of 47±8 pm/V at λ=1535 nm, 50±5 pm/V at λ=1313 nm, and 77±8 pm/V at λ=800 nm, respectively. (See, e.g., F. Pan, G. Knöpfle, Ch. Bosshard, S. Follonier, R. Spreiter, M. S. Wong, and P. Günter, "Electro-Optic Properties of the Organic Salt 4-N,N-dimethylamino-4'-N'-methyl-stilbazolium tosylate," Appl. Phys. Lett. 69, 13–15 (1996), hereby incorporated by reference herein in its entirety.)

The high refractive index (n=2.18@1313 nm) and low dielectric constant (e.g., $\in_{11}$=5.2) are additional advantages for high-speed electro-optic modulation. At λ=1313 nm, which is a wavelength appropriate for optical communication, DAST crystals offer a bandwidth $\Delta f_{3\ dB}$ of 140 Ghz for L=1 cm, and their figure of merit $n^7r^2_{eff}/\in$ is 130[×10$^3$(pm/V)$^2$]. (See, e.g., Ch. Bosshard, M.-S. Wong, F. Pan, R. Spreiter, S. Follonier, U. Meier and P. Günter, "Novel Organic Crystals For Nonlinear and Electro-Optics" R. W. Munn et al (Eds.) in Electrical and Related Properties of Organic Solids, 279–296 (1997), hereby incorporated by reference herein in its entirety.) The bandwidth and figure of merit of DAST are about 21 times larger than those of $LiNbO_3$. Their large electro-optic coefficients, high modulation bandwidths, and low power consumption make DAST crystals highly desirable for electro-optic applications.

What is now required are improved, easily produced organic crystal compound waveguide configurations, and reliable methods for their production, which will offer the required levels and quality of optical coupling to and/or from the optically proximate transmitting waveguide, while maintaining the advantages of the crystals' large electro-optic coefficients, high modulation bandwidths, and lower power consumption.

SUMMARY OF THE INVENTION

Improved, easily produced organic crystal compound waveguide configurations, and reliable methods for their production, are provided by the present invention, which in one aspect relates to an optical coupling device in which optical energy is coupled to or from an optical signal propagating along a transmitting waveguide. The optical coupling device comprises a thin film organic crystal waveguide positioned in optical proximity to a portion of the transmitting waveguide. The organic crystal waveguide has a first, coupling surface facing towards a portion of the transmitting waveguide through which the optical energy is coupled. The transmitting waveguide may be a fiber optic having at least some material removed therefrom near the portion to facilitate the coupling of optical energy to or from the fiber optic. In one embodiment, the thickness of the organic crystal waveguide measured between its first surface, and a second, opposing surface thereof is less that 40 μm, and is preferably between 20–30 μm.

To attain the thin film thickness, the first and/or second surfaces are polished. The polishing may also result in an optical smoothness of less than a wavelength/4, where the wavelength is about 1300 nm–580 nm.

The organic crystal may be formed from an organic salt, and the organic salt may comprise DAST.

To facilitate electro-optic operation of the optical coupling device, at least one electrode may be disposed about the organic crystal waveguide.

In another aspect, the present invention relates to a method for producing an optical coupling device, which includes the steps of: providing a sample of an organic crystal; providing a device block having an optical signal transmitting waveguide running therethrough; polishing a first surface of the sample to a sufficient optical smoothness; affixing the sample to the device block with the first surface facing a portion of the transmitting waveguide and therefore providing a coupling surface through which optical energy is coupled to or from the transmitting waveguide; and thereafter polishing a second, opposing surface of the sample such that the sample obtains a thin film thickness.

The polishing steps may be preceded by lapping steps, and organic crystal samples may be placed about the sample to minimize lapping and/or polishing stress placed on the sample.

The sample (e.g., DAST) may be provided by growing an organic crystal, and cutting the sample from the grown crystal. Using this method, the above-discussed thin film thicknesses and optical smoothnesses of the sample can be attained.

In another aspect, the present invention relates to a method for coupling optical energy to or from a transmitting waveguide. The method for coupling includes using a thin film organic crystal waveguide placed in proximity to a portion of the transmitting waveguide. The transmitting waveguide may be a fiber optic having material removed therefrom toward its core and near the portion thereof to facilitate the coupling of optical energy to or from the fiber optic.

The compound waveguide devices disclosed herein, based on polished, thin film C-plate organic crystals (e.g., DAST), can yield new, efficient and fast non-linear optic and electro-optic devices for high speed optical telecommunication applications. The heretofore unrealized thicknesses and smoothnesses of the organic crystal overlay waveguide offer new and improved optical coupling characteristics.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE EMBODIMENT(S)

As discussed above, an optical waveguide (possibly electro-optically tunable) can be a useful device for the selective coupling of optical energy from a portion of a second broad-band or multi-band waveguide placed in optical proximity thereto. For example, the presence of a high index (e.g., >about 1.45), multi-mode waveguide in optical proximity to a portion of a single-mode optical fiber can result in a predictable spectral response of the carrier band, following its interaction with the waveguide. When a single-mode optical fiber, having a portion of its cladding removed, is placed in proximity to such a high index, "overlay" waveguide, the resultant spectral response is that of a periodic bandstop wavelength filter. In this configuration, the waveguide is positioned in optical proximity to the fiber such that only those frequencies (wavelengths) of the optical carrier within the spectral resonances of the device evanescently couple to the overlay. This results in a non-invasive coupler which does not suffer the insertion losses normally associated with in-line couplers which interrupt the fiber core itself.

Figure 1A:
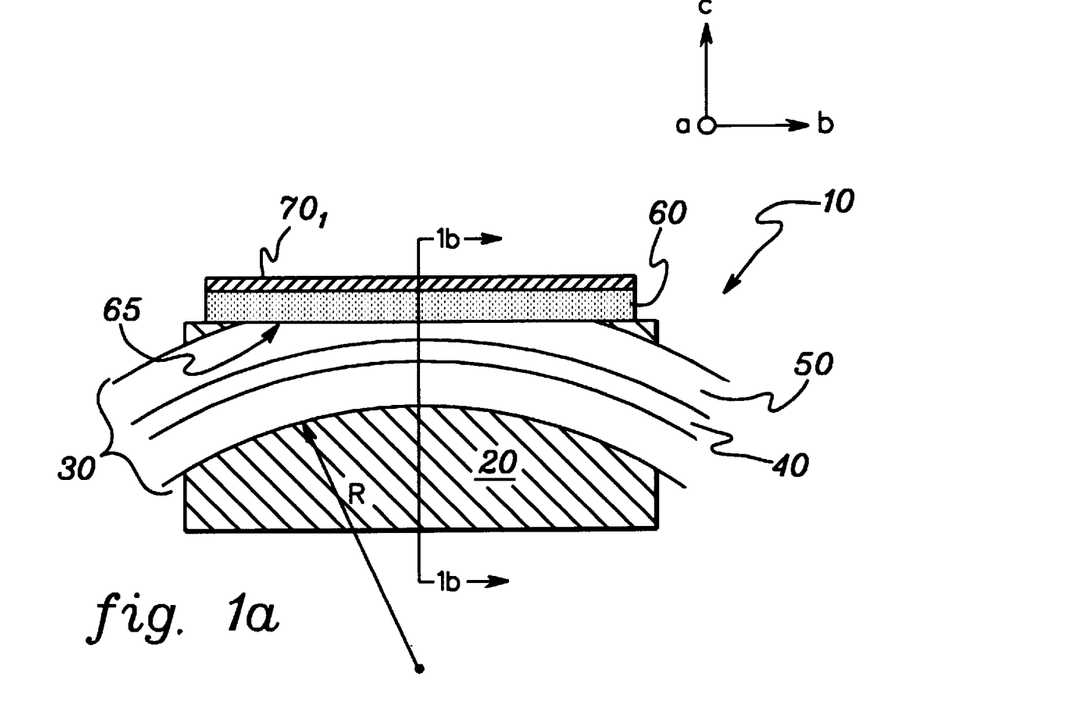
FIGS. 1a–b are cross-sectional views of a compound waveguide having an organic crystal, thin film overlay waveguide formed on a block holding a fiber optic, in accordance with the principles of the present invention.
Figure 1B:
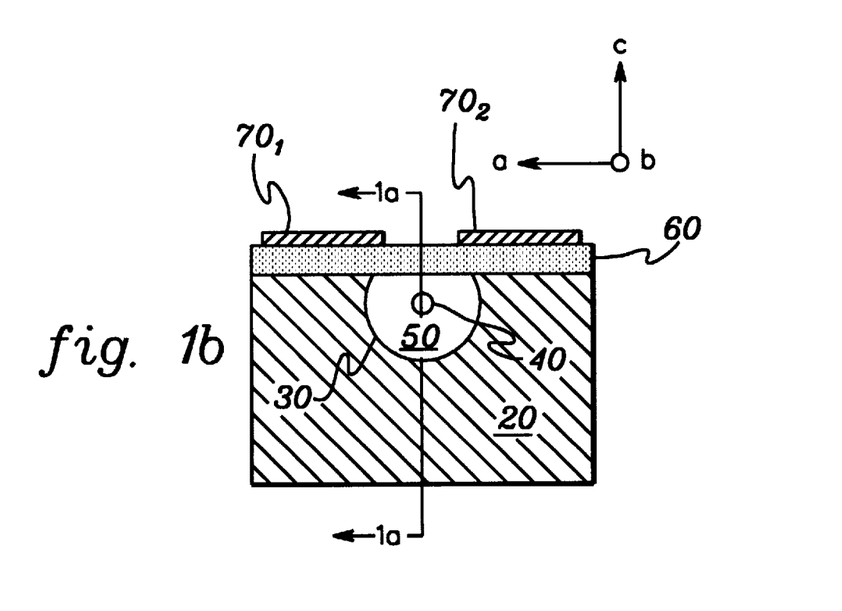

With reference to FIGS. 1a–b, and in accordance with the present invention, a compound waveguide device 10 includes a fused silica substrate block 20, adapted (e.g., having a groove) to accommodate a transmitting waveguide 30 running therethrough. (Like reference numerals are used for like elements throughout the drawings.) In the exemplary embodiment of FIGS. 1a–b, waveguide 30 comprises a single-mode fiber optic cable having a core 40 encased by cladding 50. When such a single-mode optical fiber has the cladding removed toward its core (e.g., to within 5 $\mu$m), and is placed in optical proximity to "overlay" waveguide 60 (e.g., a high index, planar, multimode overlay formed from DAST), evanescent coupling occurs through interaction area 65 such that optical energy is coupled to or from the fiber optic according to the refractive indices of the fiber optic and overlay waveguide 60. (Though FIGS. 1a–b depict a direct contact between waveguides 30 and 60, it should be understood by those skilled in the art that intervening adhesive, transparent electrode, and/or index matching layers may be present at this interface.) Optional electrodes $70_1$ and $70_2$ can be used to apply an electric field to overlay waveguide 60.

The basic principle of operation of the compound waveguide relies on the evanescent coupling between the single-mode optical fiber 30, having the cladding removed close to its core, and the high index, planar, multimode DAST waveguide 60. When phase matching of the propagation constant of the single mode fiber and that of a mode of the multi-mode DAST waveguide 60 is established, strong coupling of optical power to or from the fiber 30 to the DAST waveguide occurs along interaction area 65. (Those skilled in the art will recognize that, though the net effect of the coupling may be a removal of optical energy from select bands in the fiber optic, this energy may actually temporarily oscillate between the overlay and the fiber along the interaction area. The phrase "coupling optical energy to or from" the fiber is used broadly herein, and without limitation, to describe both the net energy transfer and/or this potential oscillation.) The phase matching can be switched on and off when the refractive index of the DAST waveguide 60 is altered. The refractive index of DAST can be efficiently varied under the induction of an electric field along, e.g., the $x_1$-dielectric axis, leading to an electro-optic response. Thus, the compound waveguide can be used for electro-optic modulation or filtering of the signal transmitted in fiber 20.

A standard single mode optical fiber (SMF-28) can be used, in one example, with a core region of 8.3 $\mu$m and a cladding of 125 $\mu$m. The fiber is fixed in a groove cut in the substrate 20 (e.g., glass block) with some curvature "R". The fiber cladding and the block surface can be lapped and polished together down toward the fiber core (about 2–5 $\mu$m).

In accordance with the present invention, the organic crystal overlay waveguide 60 (e.g., DAST) is a polished waveguide, and has a thin film thickness and optical smoothness heretofore unknown and unrealizable. The thin film thickness and optical smoothness of the DAST waveguide significantly improve the operational characteristics of the compound waveguide. For example, thinning the waveguide alters its mode structure and results in a spreading of the peaks of the spectral resonances caused by the mode structure. (Exemplary spectral responses are discussed below with reference to FIGS. 4a and 4b.) A spreading of the spectral resonances effectively creates a single mode waveguide near the transmission wavelength of interest, thereby allowing more predictable selectivity, and eliminating interference from adjacent peaks. Further, the improved optical smoothness reduces optical scattering and losses, and therefore increases the overall coupling efficiency of the device. Smoothness of less than the operating wavelength $\lambda$ is desirable, and smoothness to $\lambda/2-\lambda/4$ is preferable. With reference to the grown DAST C-plate of FIG. 2, and the fabrication flow diagram of FIG. 3, the process 100 used to prepare and install the polished, thin film DAST overlay 60 will now be described.

Figure 2:
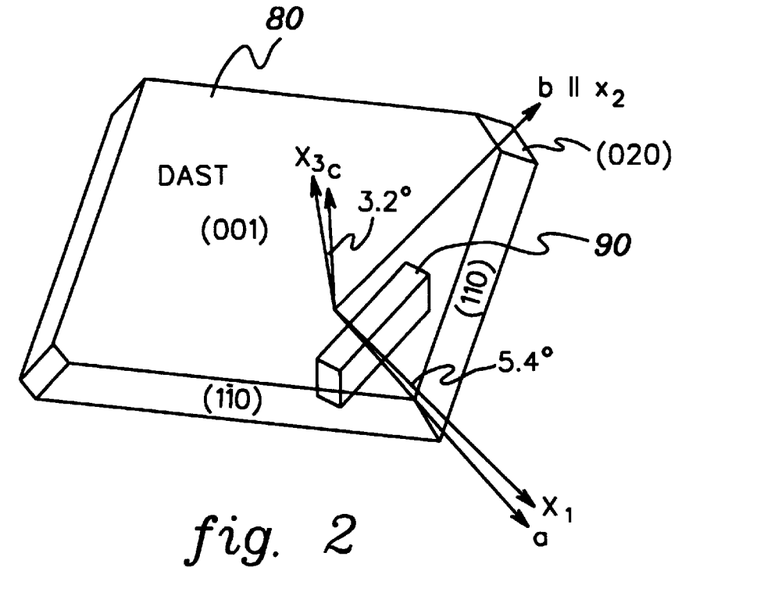
FIG. 2 depicts a grown organic crystal (DAST) C-plate having a sample designated for removal therefrom for subsequent use as a thin film overlay waveguide.

Anhydrous DAST crystals appear as red-greenish plates, which belong to the monoclinic space group Cc (point group m, z=4) with the lattice parameters a=10.365 Å, b=11.322 Å, c=17.893 Å, and $\beta$=92.24°. Thermal analysis by differential scanning calorimetry (DSC) demonstrates that the melting point of the crystal is 256° C. Methanol is a suitable solvent for the growth of high-quality DAST crystals. DAST single crystals can be grown from a seeded, saturated methanol solution by controlled lowering of the temperature at a rate of 0.1–0.2° C./day. The temperature stability of the growth apparatus should be better than 0.02° C. The crystals normally grow as C-plates 80, as shown in FIG. 2. The angles between the dielectric principal axes $x_1$ and $x_3$ and the crystallographic axes a and c are very small, 5.4° and 3.2° respectively, so that a≅$x_1$, and c≅$x_3$, whereas the $x_2$-axis coincides with b-axis (see FIG. 2). The polar axis of the crystal is along $x_1$. For electro-optic modulators, single crystals of DAST can be oriented using a polarizing microscope and the crystal morphology cut into C-plate samples (e.g., sample 90 shown in FIG. 2) with dimensions of about: a×b×c=3×7×0.8 mm (FIG. 3, step 110).

The resultant sample is then prepared by lapping and polishing a first one of the C-faces of the cut sample. For example, a given sample is affixed to a glass plate with co-planar samples positioned around it to reduce the pressure of the subsequent polishing and lapping (step 112). The glass plate is affixed to a polishing jig (step 114) with wax (temp.=52° C.), and the first C-face of the sample is lapped (in a clean environment to minimize hard dusts) so that the sample reaches a thickness of about 0.5 $\mu$m and a sufficient optical smoothness, with 9 $\mu$m and 3 $\mu$m lapping powder (step 116). The sample is then polished (step 116) with a 0.5 $\mu$m polishing powder (e.g., $Al_2O_3$ or $CeO_2$) with oil used as the polishing liquid, to the level of the lowest scratch.

Polarized microscopy investigations show that these samples can be homogeneous without cracks or solvent inclusions in the crystal. Furthermore, interference pictures show that the optical surfaces are flat to a wavelength level, or about $\lambda/2$–$\lambda/4$ ($\lambda$≅580 nm), and also confirm the resultant, high optical quality of the polished surface.

Figure 3:
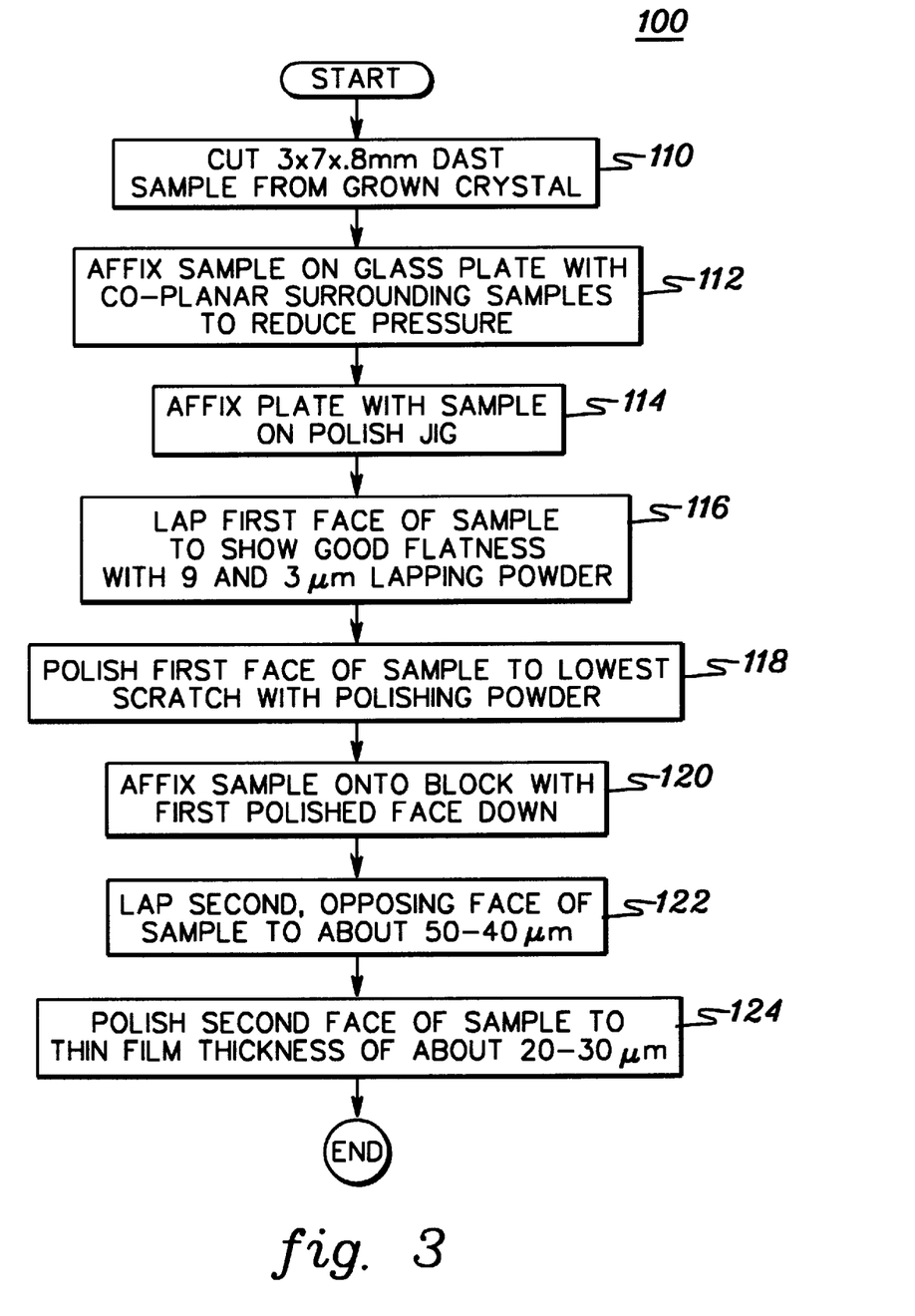
FIG. 3 is a flow diagram of the processing steps used to fabricate the thin film overlay waveguide portion of the compound waveguide of FIGS. 1a–b.

The polished sample is then bonded (first, polished face down) on the side-polished fiber half-block with a low-index, low-viscosity UV glue or epoxy (FIG. 3, step 120). The a-axis ($x_1$-axis) of the sample is oriented normal to the fiber core (see FIG. 1). The second, upper face of DAST sample is then lapped (with the 9 $\mu$m and 3 $\mu$m powder) such that the sample thickness reaches about 50–40 $\mu$m (FIG. 3, step 122) and polished (with the 0.5 $\mu$m polishing powder and oil) until it is reduced to a thin film, in one example, to a thickness of about 20–30 $\mu$m (FIG. 3, step 124). Since DAST is an organic crystal which tends to be mechanically weak, the crystal cracks very easily as it is thinned, such as below a 100 $\mu$m thickness (the thickness below which a device is characterized as thin film). However, by carefully controlling the pressure of lapping and polishing to minimize the induced stress and by using the above-discussed lapping and polishing powder and liquids, the DAST samples can be polished down to thin film thickness, for example, a thickness of about 15 $\mu$m.

The resultant waveguide thickness should be between 15 $\mu$m and 40 $\mu$m. The optimal coupling effects occur between 20 and 30 $\mu$m thickness.

The thin film DAST sample operates as a planar multimode overlay waveguide in the compound waveguide. TE polarization is parallel to the $x_1$-dielectric axis, while TM polarization is parallel to the $x_3$-dielectric axis. There are strong birefringence effects along the $x_1$- and $x_3$-axes due to the large difference between their refractive indices, such as $n_1$=2.18 and $n_3$=1.60 at $\lambda$=1.3 $\mu$m, respectively.

Various other organic salts are also suitable for use as the overlay waveguide, for example, any of the organic salts described in the following commonly-assigned U.S. Patents: U.S. Pat. No. 5,360,911, entitled "Process for the Preparation of Stilbazolium Salts," U.S. Pat. No. 5,194,984, entitled "Stilbazolium Salt and Optically Non-Linear Devices Incorporating Same," U.S. Pat. No. 5,292,888, entitled "High Melting Point Stilbazolium Salts," U.S. Pat. No. 5,332,827, entitled "Deuterated Organic Salts Useful in Nonlinear Optical Applications," U.S. Pat. No. 5,323,482, entitled "Deuterated Organic Salts Useful in Nonlinear Optical Applications, and U.S. Pat. No. 5,396,362, entitled "High Resolution Micromachining of Organic Crystals and Optical Modulators Formed Thereby." Each of these U.S. Patents is hereby incorporated by reference herein in its entirety. Orientations of the crystal and cuts will vary depending on the type of crystal used.

In one exemplary embodiment of a compound waveguide in accordance with the present invention, a fiber was used (having a portion of its cladding removed) with a 55% coupling strength at $\lambda$=1.3 $\mu$m (measured using an oil with a refractive index of $n_D$=1.6 applied in bulk form to the surface of the side-polished fiber); the radius of curvature (FIG. 1, "R") of the fiber was about 27 cm, and an overlay waveguide fabricated according to the process 100 described above was used having a thickness of approximately 25 $\mu$m. The measured responses of this exemplary compound waveguide are depicted in FIGS. 4a–b.

Figure 4A:
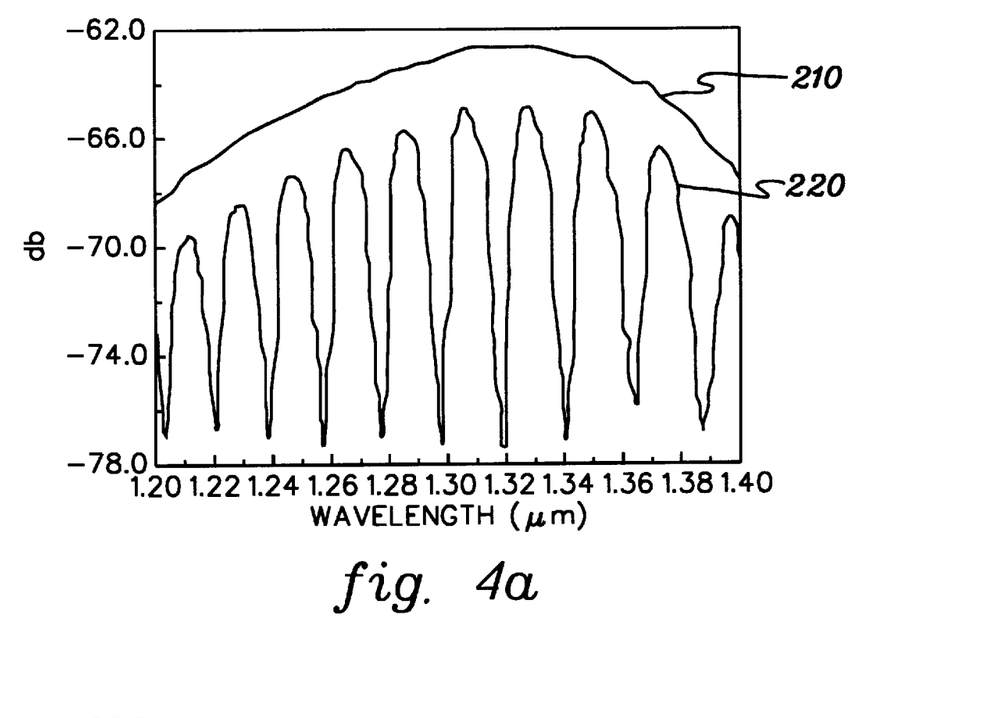
FIGS. 4a–b are plots of the optical responses of an exemplary compound waveguide along the $x_1$ (TE) and $x_3$ (TM) axes of the overlay waveguide, respectively.
Figure 4B:
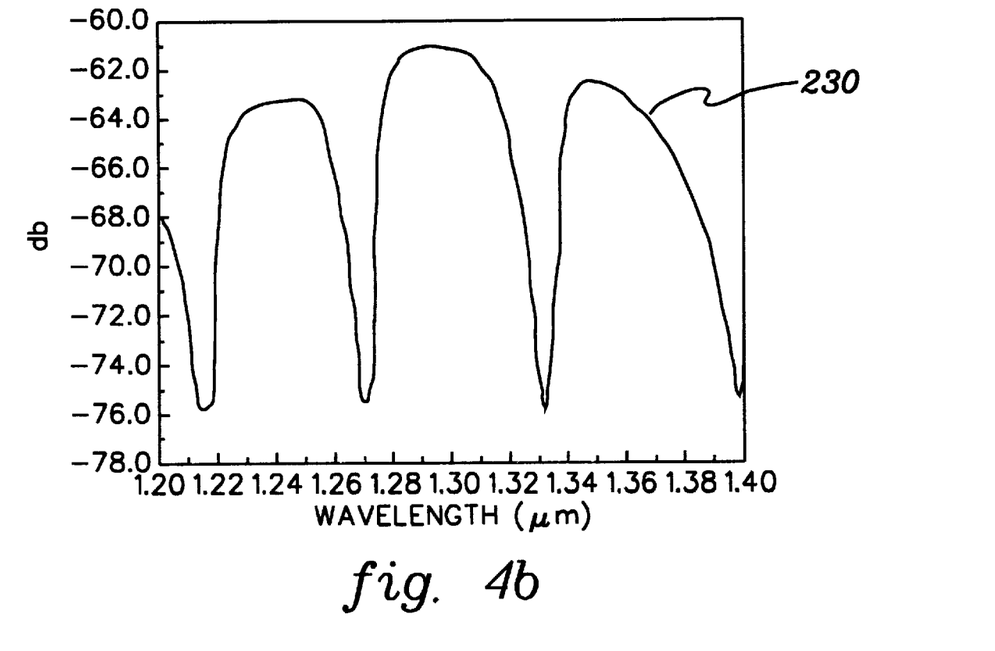

A light emitting diode (LED) was used as the light source (curve 210, FIG. 4a), and the wavelength response of the waveguide was recorded (see TE curve 220, FIG. 4a; and TM curve 230, FIG. 4b). The device shows a narrow linewidth (3 nm for TE, 10 nm for TM) and a resonance spacing of approximately 21 nm for TE and 61.5 nm for TM in the 1200–1400 nm range. The large difference between TM and TE resonance spacing is a result of the large birefringence ($n_1$=2.18 and $n_3$=1.60 at $\lambda$=1.3 $\mu$m). Off-resonance insertion loss was very low (<0.2 dB) while the modulation depth was 94% (12.5 dB) for TE polarization and 97% (14.5 dB) for TM polarization.

Figure 5:
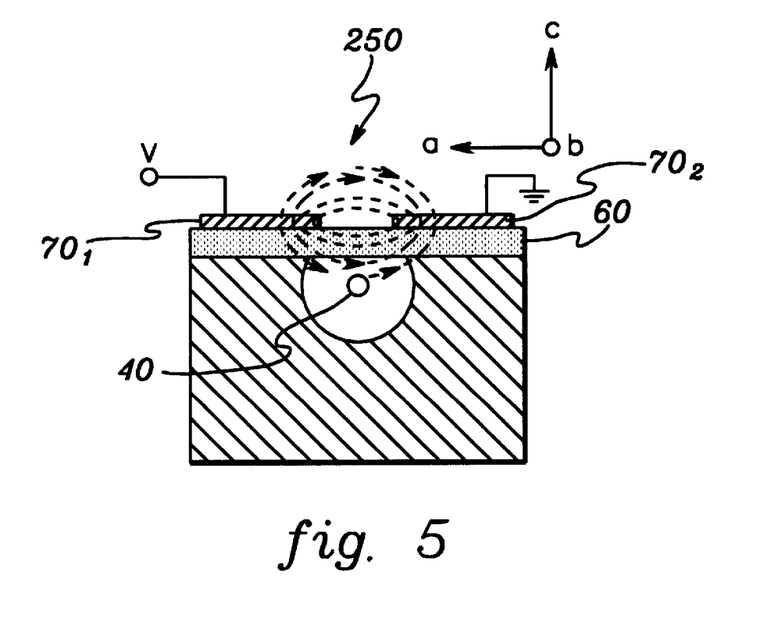
FIG. 5 depicts an electro-optically tunable embodiment of the compound waveguide of the present invention.

With reference to FIG. 5, for electro-optic applications, electrode patterns (e.g., electrodes $70_1$ and $70_2$) can be employed about or on the thin film waveguide 60. The electrode edge is parallel to both the side-polished fiber and the b-axis of the waveguide, so that the electric field lines 250 are parallel to the a-axis ($x_1$-axis). In TE polarization, the refractive index modulation occurs with low power consumption (a low applied voltage) due to the large electro-optic coefficients, high refractive index, and low dielectric constant along the $x_1$-axis. The resonance lines can be shifted according to an applied voltage. When a microwave electric field is applied using the electrodes, fast electro-optic modulation can be achieved due to the high modulation bandwidths (140 Ghz) of DAST crystals.

The compound waveguide architecture disclosed herein can be used to produce continuous-fiber devices for high speed optical telecommunication applications. When polished, thin film nonlinear optical (NLO) organic crystals are used as the overlay, the optical coupling between the fiber and overlay can be used for passive or electro-optic filtering, parametric amplification, frequency conversion, switching, or amplitude or phase modulation. (The terms "optical coupling" and "optical coupling device" are used broadly herein and without limitation to connote any one of the above-listed devices, or any related devices in which optical energy is coupled.)

Properties of the overlay waveguide materials dominate the efficiency of the devices. Crystals of the organic salt 4-N,N-dimethylamino4'-N'-methylstilbazolium tosylate (DAST) exhibit one of the largest second-order NLO coefficients on record, along with a low dielectric constant, transparency from 700 nm to 2000 nm, and thermal stability to 259° C. C-plate DAST samples with large sizes can be obtained more easily than other orientations. Since the polar axis, a-axis (or $x_1$-axis), of DAST lies within the planar habit of C-face crystals, the largest second-order NLO and electro-optical coefficients, $d_{11}$ and $r_{11}$ respectively, can be readily accessed for maximal NLO and electro-optical response. Hence, compound waveguides based on polished, thin film C-plate DAST can yield new, efficient and fast NLO and electro-optic devices for high speed optical telecommunication applications.

The overlay waveguide, in its final form, can either comprise a "slab" or "planar" waveguide, or can be further modified into a "channel" waveguide of the type disclosed in the above-incorporated U.S. Patent Applications entitled "Electro-Optic Compound Waveguide Modulator" and "Compound Optical Waveguide and Filter Applications Thereof." As set forth in detail in these applications, there are certain operational differences between slab or planar waveguides, and channel waveguides. In general, slab or planar waveguides rely on lateral diffraction of the coupled optical energy, whereas channel waveguides confine the coupled optical energy, and rely on the periodicity along the tuned interaction length to provide the required response characteristic.

While the invention has been particularly shown and described with reference to preferred embodiment(s) thereof, it will be understood by those skilled in the art that various changes in form and details may be made therein without departing from the spirit and scope of the invention.

What is claimed is:

1. An optical coupling device in which optical energy is coupled to or from an optical signal propagating along a transmitting waveguide, the optical coupling device comprising:
    a thin film, organic crystal waveguide positioned in optical proximity to an internal portion of the transmitting waveguide and having a first, coupling surface facing toward the portion of the transmitting waveguide through which the optical energy is coupled to intensity modulate the optical signal propagating along the transmitting waveguide.

2. The optical coupling device of claim 1, wherein the transmitting waveguide comprises a fiber optic having at least some material removed along a side thereof near said portion to facilitate the coupling of optical energy to or from the fiber optic.

3. The optical coupling device of claim 2, wherein a thickness of said organic crystal waveguide measured between the first and a second, opposing surface thereof is less than 40 $\mu$m.

4. The optical coupling device of claim 3, wherein the thickness of said organic crystal waveguide measured between the first and second surfaces thereof is between 20 $\mu$m and 30 $\mu$m.

5. The optical coupling device of claim 2, wherein the first, coupling surface and/or a second, opposing surface of said organic crystal waveguide are polished to an optical smoothness of less than a wavelength/4, wherein the wavelength is about 1,300 nm.

6. The optical coupling device of claim 5, wherein the first and/or second surfaces are polished to an optical smoothness of less than a wavelength/4, wherein the wavelength is about 580 nm.

7. The optical coupling device of claim 2, wherein said organic crystal waveguide is formed from an organic salt.

8. The optical coupling device of claim 7, wherein the organic salt comprises DAST.

9. The optical coupling device of claim 2, further comprising:
    at least one electrode disposed about said organic crystal waveguide to facilitate electro-optic operation thereof.

10. The optical coupling device of claim 1, wherein said organic crystal waveguide comprises one of a slab waveguide and a channel waveguide.

11. An optical coupling device in which optical energy is coupled to or from an optical signal propagating along a transmitting waveguide, the optical coupling device comprising:
    a polished, organic crystal waveguide positioned in optical proximity to an internal portion of the transmitting waveguide and having a first, coupling surface facing toward the portion of the fiber optic through which the optical energy is coupled to intensity modulate the optical signal propagating along the transmitting waveguide.

12. The optical coupling device of claim 11, wherein the transmitting waveguide comprises a fiber optic having at least some material removed along a side thereof near said portion to facilitate the coupling of optical energy to or from the fiber optic.

13. The optical coupling device of claim 11, wherein the first, coupling surface and/or a second, opposing surface of said organic crystal waveguide are polished.

14. The optical coupling device of claim 13, wherein the organic crystal waveguide comprises a thin film waveguide, and wherein a thickness of the waveguide measured between the first and second surfaces thereof is less than 40 $\mu$m.

15. The optical coupling device of claim 14, wherein the thickness of the waveguide measured between the first and second surfaces thereof is between 20 $\mu$m and 30 $\mu$m.

16. The optical coupling device of claim 15, wherein the first and/or second surfaces are polished to an optical smoothness of less than a wavelength/4, wherein the wavelength is about 1,300 nm.

17. The optical coupling device of claim 16, wherein the first and/or second surfaces are polished to an optical smoothness of less than a wavelength/4, wherein the wavelength is about 580 nm.

18. The optical coupling device of claim 11, wherein the organic crystal waveguide is formed from an organic salt.

19. The optical coupling device of claim 18, wherein the organic salt comprises DAST.

20. The optical coupling device of claim 11, further comprising:
    at least one electrode disposed about said organic crystal waveguide to facilitate electro-optic operation thereof.

21. The optical coupling device of claim 11, wherein the organic crystal waveguide comprises one of a slab waveguide and a channel waveguide.

22. A method for producing an optical coupling, intensity modulating device, comprising:
    (a) providing a sample of an organic crystal;
    (b) providing a device block having an optical signal transmitting waveguide running therethrough;
    (c) polishing a first surface of the sample to a sufficient optical smoothness;
    (d) affixing the sample to the device block with the first surface facing a portion of the transmitting waveguide and therefore providing a coupling surface through which optical energy is coupled to or from the transmitting waveguide to intensity modulate the optical signal; and
    (e) thereafter polishing a second, opposing surface of the sample such that the sample attains a thin film thickness.

23. The method of claim 22, further comprising:
    prior to said polishing (c), positioning at least one spacer around said sample to minimize lapping and/or polishing stress placed on said sample.

24. The method of claim 23, wherein the at least one spacer comprises organic crystal spacers.

25. The method of claim 22, further comprising, prior to said providing (a):
growing an organic crystal; and
cutting said sample from said grown organic crystal.

26. The method of claim 22, wherein said polishing step (c) is preceded by:
lapping the first surface of the sample.

27. The method of claim 26, wherein said polishing step (e) is preceded by:
lapping the second surface of the sample.

28. The method of claim 27, wherein the sample reaches about 50 µm thickness during said lapping said first surface.

29. The method of claim 28, wherein the sufficient optical smoothness of said polishing (c) comprises an optical smoothness of less than a wavelength/4, wherein the wavelength is about 580 nm.

30. The method of claim 29, wherein the thin film thickness is less than 40 µm.

31. The method of claim 30, wherein the sample comprises an organic salt.

32. The method of claim 31, wherein the organic salt comprises DAST.

33. The method of claim 22, wherein the sample comprises an organic salt.

34. The method of claim 33, wherein the organic salt comprises DAST.

35. The method of claim 22, wherein the thin film thickness is less than 35 µm.

36. The method of claim 22, further comprising:
applying at least one electrode about the sample to facilitate electro-optic operation thereof.

37. The method of claim 22, wherein transmitting waveguide comprises a fiber optic.

38. The method of claim 37, further comprising:
removing at least some material along a side of, and toward a core of, the fiber optic to facilitate coupling of the optical energy to or from the fiber optic.

39. An optical coupling, intensity modulating device produced according to the method of claim 38.

40. An optical coupling, intensity modulating device produced according to the method of claim 22.

41. A method for producing an optical coupling, intensity modulating device, comprising:
thinning an organic crystal waveguide to a thin film thickness; and
placing the organic crystal waveguide in optical proximity to a portion of a transmitting waveguide to couple optical energy thereto or therefrom to intensity modulate an optical signal propagating in the transmitting waveguide.

42. The method of claim 41, wherein said thinning comprises:
polishing said organic crystal.

43. The method of claim 42, wherein the thin film thickness is less than 40 µm.

44. The method of claim 43, wherein the transmitting waveguide is a fiber optic having at least some material removed therefrom along a side thereof near said portion to facilitate the coupling of optical energy to or from the fiber optic.

45. The method of claim 44, wherein the organic crystal comprises DAST.

46. An optical coupling, intensity modulating device formed according to the method of claim 45.

47. An optical coupling, intensity modulating device formed according to the method of claim 41.

48. A method for coupling optical energy to or from a transmitting waveguide, comprising:
using a thin film organic crystal waveguide placed in optical proximity to a portion of said transmitting waveguide to intensity modulate an optical signal propagating in the transmitting wave guide.

49. The method of claim 48, wherein the transmitting waveguide comprises a fiber optic having material removed therefrom along its side and toward its core and near said portion to facilitate the coupling of optical energy to or from the fiber optic.

50. The method of claim 48, wherein the thin film organic crystal waveguide has a thickness between 20 µm and 30 µm, and has an optical smoothness of a wavelength/4 wherein the wavelength is 580 nm.

51. The method of claim 50, wherein the organic crystal comprises DAST.

* * * * *